(12) United States Patent
Nagornõi et al.

(10) Patent No.: US 12,303,869 B2
(45) Date of Patent: May 20, 2025

(54) NANOSIZED CERAMIC PLASMA CATALYST FOR STABILIZING AND ASSISTING PLASMA COMBUSTION

(71) Applicant: EFENCO OÜ, Sillamäe (EE)

(72) Inventors: Aleksander Nagornõi, Sillamäe (EE); Aleksandr Vlasov, Sillamäe (EE); Kristjan Tiik, Järsi küla (EE); Peter Alexander Woolsey, Oxfordshire (GB)

(73) Assignee: EFENCO OÜ, Sillamäe (EE)

( * ) Notice: Subject to any disclaimer, the term of this patent is extended or adjusted under 35 U.S.C. 154(b) by 352 days.

(21) Appl. No.: 17/908,329

(22) PCT Filed: Mar. 24, 2020

(86) PCT No.: PCT/EP2020/058213
§ 371 (c)(1),
(2) Date: Aug. 31, 2022

(87) PCT Pub. No.: WO2021/190734
PCT Pub. Date: Sep. 30, 2021

(65) Prior Publication Data
US 2023/0076755 A1    Mar. 9, 2023

(51) Int. Cl.
*B01J 23/00*    (2006.01)
*B01J 35/23*    (2024.01)
(Continued)

(52) U.S. Cl.
CPC .............. *B01J 23/002* (2013.01); *B01J 35/23* (2024.01); *B01J 35/33* (2024.01); *B01J 35/40* (2024.01); *B01J 35/56* (2024.01)

(58) Field of Classification Search
None
See application file for complete search history.

(56) References Cited

U.S. PATENT DOCUMENTS 5,314,569 A * 5/1994 Pribat .................. C30B 23/007
117/939
6,270,571 B1 * 8/2001 Iwasaki ................ C30B 25/005
117/9

(Continued)

FOREIGN PATENT DOCUMENTS

CN    108895482 A    11/2018
CN    109999817 A    7/2019

(Continued)

OTHER PUBLICATIONS

Machine Translation, WO-2007026927-A1, Higuchi H, Mar. 8, 2007 (Year: 2007).*

(Continued)

*Primary Examiner* — Coris Fung
*Assistant Examiner* — Jialan Zhang
(74) *Attorney, Agent, or Firm* — LADAS & PARRY LLP

(57) ABSTRACT

A new plasma catalyst in the form of a ceramic-matrix nanocomposite is disclosed for application to the plasma-assisted combustion. The new functionality of the nanoceramic plasma catalyst is driven by the synergistic effect of plasma and solids. The plasma catalyst is based on combinations of valve metal oxides, polar transition-metal oxides, rare-earth oxides and phosphides, alkali metal oxides, silicon oxides and nitrides, etc. are disclosed. The advantage of combining a heterogeneous catalytic and plasma catalytic effect allows utility for large area applications and is scalable for large-scale industries.

16 Claims, 10 Drawing Sheets

Summary of disclosed embodiments

- The main size-driven physical phenomena in ferroelectrics.

- The embodiment of the basic physical phenomena in the form of a plasma catalyst.

- Plasma catalyst: overall architectural concept.

- Plasma catalyst: key elements, structure and materials.

- Plasma catalyst: key elements bonding.

(51) Int. Cl.
*B01J 35/33* (2024.01)
*B01J 35/40* (2024.01)
*B01J 35/56* (2024.01)

(56) References Cited

U.S. PATENT DOCUMENTS

| | | |
|---|---|---|
| 7,592,564 B2 | 9/2009 | Kumar et al. |
| 7,608,147 B2 * | 10/2009 | Samuelson ............ B82Y 10/00 |
| | | 117/88 |
| 7,608,798 B2 | 10/2009 | Kumar et al. |
| 2005/0011431 A1 | 1/2005 | Samuelson et al. |
| 2019/0321799 A1 | 10/2019 | Kim et al. |

FOREIGN PATENT DOCUMENTS

| | | | |
|---|---|---|---|
| EP | 1637626 A2 | 3/2006 | |
| EP | 3280230 A1 | 2/2018 | |
| KR | 20180116952 A | 10/2018 | |
| KR | 20190092939 A | 8/2019 | |
| WO | WO-2007026927 A1 * | 3/2007 | ........... H01G 9/2031 |
| WO | 2009116868 A | 9/2009 | |

OTHER PUBLICATIONS

International Search Report of Application No. PCT/EP2020/058213 mailed Nov. 26, 2020.

Written Opinion of Application No. PCT/EP2020/058213 mailed Nov. 26, 2020.

Heng F. Zhang: "Formation of Salt Crystal Whiskers on Nanoporous Coatings and Coating onto Open Celled Foam", ISBN 978-1-267-48828-2, (Jan. 1, 2012), URL:https://conservancy.umn.edu/bitstream/handle/11299/128313/Zhang_umn_0130E_12439.pdf?sequence=1, (Nov. 13, 202), XP055750438 [I] 1,2,7,8 * the whole document * * pp. 22-25 * *p. 145 * [A] 3-6,9,10.

J. Christopher Whitehead: "Plasma catalysis: A solution for environmental problems": Pure & Applied Chemistry, vol. 82, No. 6, Apr. 20, 2010 (Apr. 20, 2010), pp. 1329-1336, XP055936169, GB ISSN: 0033-4545, DOI: 10.1351 / PAC-CON-10-2-39 Retrieved from the Internet: URL:http://dx.doi.org/10.1351 /PACCON-10-2-39 cited in the application.

* cited by examiner

FIG. 1

Summary of disclosed embodiments

- The main size-driven physical phenomena in ferroelectrics.
- The embodiment of the basic physical phenomena in the form of a plasma catalyst.
- Plasma catalyst: overall architectural concept.
- Plasma catalyst: key elements, structure and materials.
- Plasma catalyst: key elements bonding.

Size-driven effects in nanoscale ferroelectric perovskites
a) Size-driven Curie temperature of second-order phase transition, $T_C$
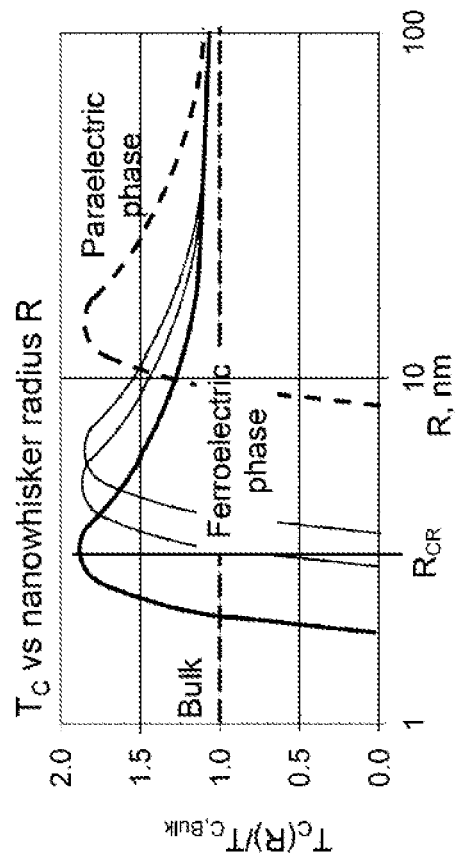
b) Size-driven pyroelectric coefficient, P
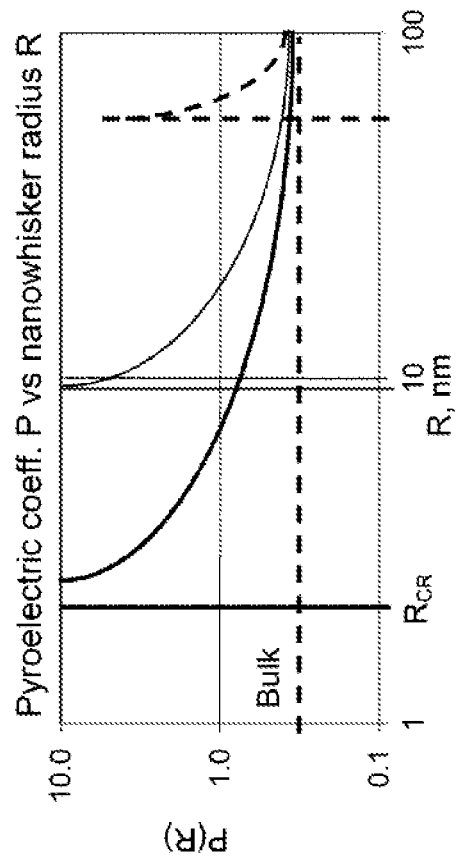
FIG. 2

FIG. 3
Electrophysical phenomena
a) Field-enhanced emission effect
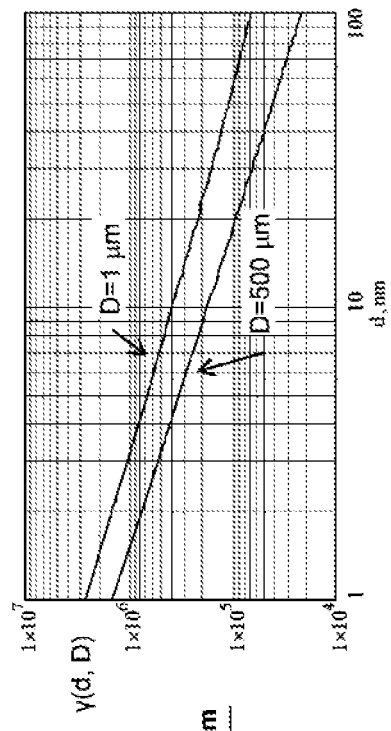
b) Field enhancement factor $\gamma(d, D)$, $cm^{-1}$
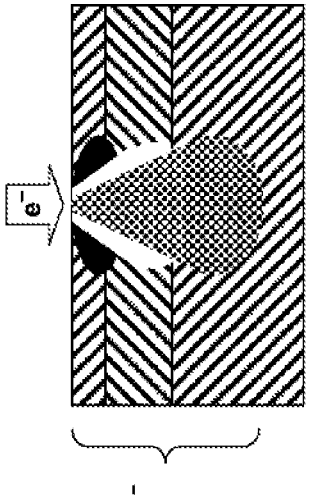
c) Electron scattering in solids
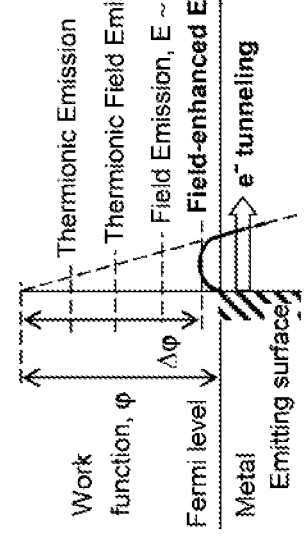
d) Electron scattering in multilayer films
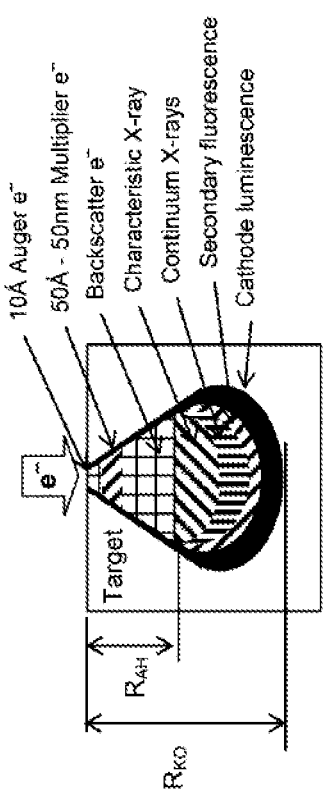

Plasma catalyst, overall architectural concept of a ceramic-matrix nanocomposite

FIG. 7 Nanoporous wafer, structure and materials a) Pores Array, One-side opened

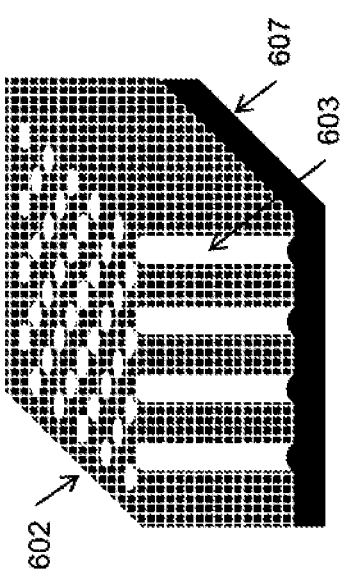

b) Pores Array, Double-side opened

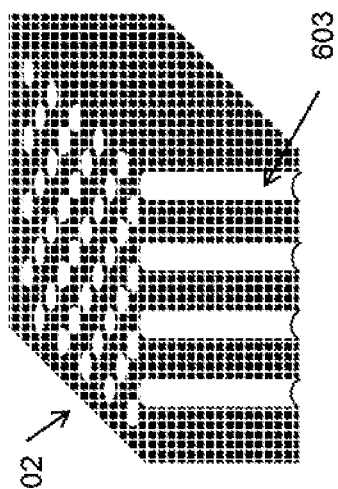

c) Materials

| Item # | Forms and Type | Materials |
|---|---|---|
| 602 | Wafer, Ceramics | Anodic Metal Oxide, Annealed Group $^{4-6, 13}$ valve metal oxides: $(Me^{4-6, 13})_x(O)_y$, where $x, y \neq 0$ |
| 602 | Wafer, Ceramics | Anodic Si/SiO$_2$, Annealed |
| 602 | Wafer, Ceramics | Anodic SiC, Annealed |
| 603 | Pore, Cylinder population | Empty channel, without a barrier layer |
| 603 | Pore, V-type population | Empty channel, without a barrier layer |
| 607 | Thin film (residual bed) | Group $^{4-6, 13}$ valve metal; Si; SiC |
| 607 | Thin film, Metal | $(Me^{4-6,10-11})_x - (Me^{4-6,10-11})_y$, where at least one of $x, y = 1$ |
| 607 | Thin film, Ceramics | Conductive Metal-Oxide-Metal composite |

FIG. 8    Nanowhiskers, structure and materials c) Materials

| Item # | Forms and Type | Materials |
|---|---|---|
| 604 | Nanowhisker, Monocrystal/Ceramics | Transition metal (Me $^{4\text{-}6,\,10\text{-}11}$); Conductive Metal-Oxide-Metal; Transparent conductive Metal-Oxide-Metal (TCO) |
| 604 | Nanowhisker, Monocrystal | Perovskite-like crystals |
| 604 | Nanowhisker, Polycrystal/Ceramics | Calcinated crystallites (homogeneous/inhomogeneous) with perovskite-like lattice |
| 605 | Whisker, Composite | Same as 604 with CNTs deposited |
| 605 | Whisker, Composite | Same as 604 with diamond tip deposited |
| 605 | Whisker, Composite | Same as 604 with (Me $^{4\text{-}6,\,10\text{-}11}$) tip deposited |
| 606 | Whisker, Composite | Same as 605 with (Me $^{4\text{-}6,\,10\text{-}11}$) deposited on the bottom |
| 606 | Whisker, Composite | Same as 605 with conductive Metal-Oxide-Metal deposited on the bottom | a) Pore, Cylinder population

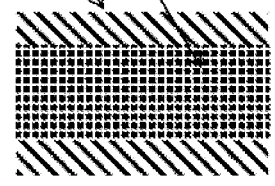

602
604
605
606 b) Pore, V-type population

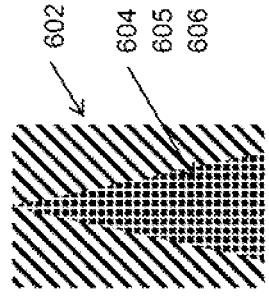

602
604
605
606

FIG. 9     Top cover, structure and materials a) Top cover wave transmittance

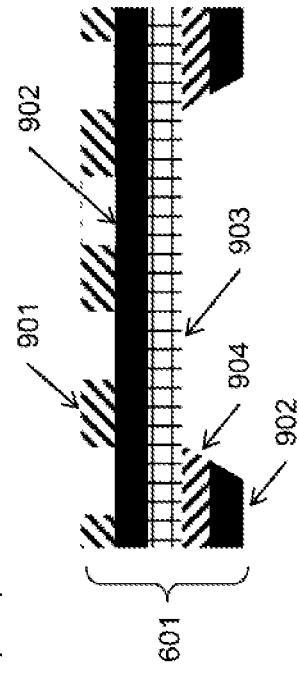

b) Top cover structure in case of multilayer films

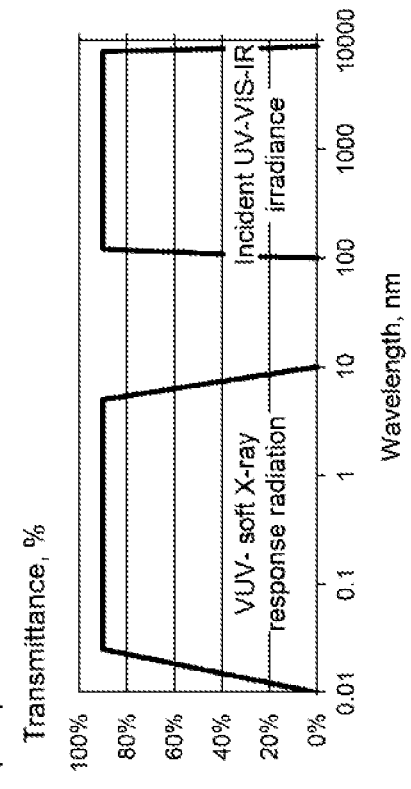

c) Top cover structure in case of wafer

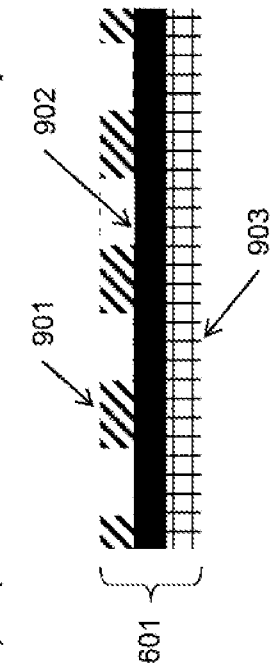

d) Materials

| Item # | Forms and Type | Materials |
|---|---|---|
| 901 | Thin film, Monocrystal or Ceramics | Metal, Metal-Oxide-Metal |
| 902 | Thin film, Ceramics | $Si_3N_4$; $SiC_xN_y$ (Free or Low-stress coating) |
| 903 | Thin film, Ceramics | Transparent conductive Metal-Oxide-Metal (TCO) |
| 904 | Wafer, Monocrystal | Si |

FIG. 10   Plasma Catalyst, wafer bonding technique a) Adhesive bonding – calcinating

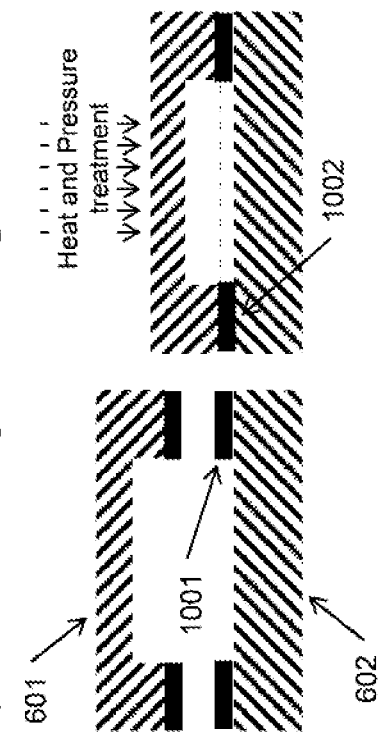

b) Glass frit bonding – soldering

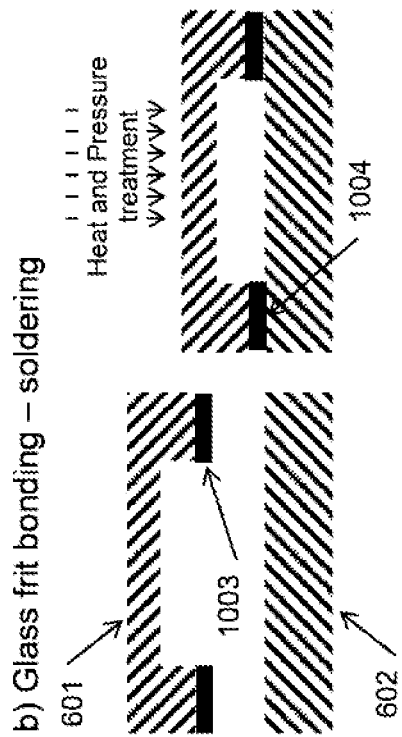

c) Materials

| Item # | Forms and Type | Materials |
|---|---|---|
| 1001 | Paste, Adhesive | $Al_2O_3$ fine powder, inorganic bonder |
| 1001 | Paste, Adhesive | AlN fine powder, inorganic binder |
| 1001 | Paste, Adhesive | Ag fine powder, inorganic binder |
| 1001 | Paste, Adhesive | Au fine powder, inorganic binder |
| 1001 | Paste, Adhesive | Ni fine powder, inorganic binder |
| 1001 | Paste, Adhesive | CNT, inorganic binder |
| 1003 | Paste, Glass frit | Lead-free Glass fine powder, organic binder |
| 1003 | Paste, Glass frit | Mixture of Lead-free Glass and Ag fine powders, organic binder |
| 1003 | Paste, Glass frit | Mixture of Lead-free Glass and Au fine powders, organic binder |

NANOSIZED CERAMIC PLASMA CATALYST FOR STABILIZING AND ASSISTING PLASMA COMBUSTION

TECHNICAL FIELD

The present invention relates to plasma catalysts for stimulating and sustaining plasma-assisted combustion, comprising a new plasma catalyst configuration in the form of so-called ceramic-matrix nanocomposite and a new combination of valve metal oxides, polar transition-metal oxides, rare-earth oxides and phosphides, alkali metal oxides, silicon oxides, silicon carbides and nitrides, including ternary and higher complexes are disclosed.

BACKGROUND ART

The catalytic properties of low-temperature, partially ionized plasmas (hereinafter LTPs) for the synthesis and reforming of matters, waste treatment, etc., are well established and already provide the enabling technologies for industries. Typically, in LTPs or so-termed nonthermal plasma, the ion pair quantity $10^9$-$10^{13}$ cm$^{-3}$ the electron temperature$\leq 10^5$ K. LTPs are nonequilibrium plasma, the electron temperature is much higher than the ion and neutral particle temperatures.

Conventional LTPs generation facilities based on an electrical discharge, a laser irradiation, super-high frequency-ultra high frequency radiation, relativistic electron beam or radio-ionization techniques, are used to form LTPs.

The disadvantages of the prior art are mainly due to the fact that plasma generation facilities are electromechanical and/or optoelectromechanical devices with a complex feedthrough for lead-in of energy forming plasma and an external high-power source, and not self-powered, in other words they are not able to harvest for example a thermal energy of the combustion in the form ultraviolet-visible-infrared (hereinafter UV-VIS-IR) irradiation band, generating electricity pyroelectrically, converting electricity thru internal field-enhanced emission and electron scattering into vacuum ultraviolet-soft X-ray (hereinafter VUV-soft X-ray) ionizing radiation band as plasma forming medium.

The disadvantages of the prior art are the difficulty in scaling plasma generation facilities for reactors of various capacities and sizes.

Drawbacks are associated with limited functionality, since only catalytic properties of the plasma are used, and not the synergistic effect that can be obtained from the plasma and the catalytic properties of surfaces that transmit and/or split out energy to form plasma.

Representative samples of the prior art are known from the following documents: U.S. Pat. No. 7,592,564B2—Plasma generation and processing with multiple radiation sources; U.S. Pat. No. 7,608,798B2—Plasma catalyst; US2019321799A1—Dielectric barrier discharge reactor for catalytic nonthermal plasma production of hydrogen from methane; KR20190092939A—Plasma-Photo Catalyst Reactor for Removal of Ammonia Packing Material coated with Photo Catalyst for the same Reactor and Preparation of the same Packing Material; CN109999817A-Cu/ZnO-ZrO2 solid solution catalyst and glow discharge plasma assisted preparation method and application thereof; KR20180116952A—Plasma and catalyst type dry reforming apparatus and method; WO2009116868A1—Process for the use of alkali metal or alkali earth metal containing organic materials and composites in the microwave-assisted plasma decomposition of said compounds for the production of syngas; CN108895482A—Combustion flame stabilizer assisted by discharging plasma.

European patent application EP3280230A1 (Efenco OÜ, published on 7 Feb. 2018) relates to a method for producing a plasma in a heat carrier for stabilization of combustion and neutralization of toxic products and a device for the same. Said invention is aimed to create so called synchrotron radiation beam with the suitable parameters and which is powerful enough and with suitable spectral composition which will be used as a finely configurable tool for selective ionization of products of combustion, i.e. hot combustion gases that form a heat carrier.

DISCLOSURE OF INVENTION

The aim of the invention is to create a plasma catalyst, which is a synergistic combination of plasma, a solid catalyst, their electrophysical mutual influence with each other as an additional reinforcing factor and that is embodied in the form of a nanocomposite for the lining of combustion chamber walls, and is intended to initiate and sustain plasma-assisted combustion.

In the context of the present invention the IUPAC Groups and chemical elements in the corresponding IUPAC groups in the periodic table referred to in the specification and claims refer to the modern standard designation of groups adopted by the IUPAC in 1990. The latest release of the IUPAC Periodic Table of Dec. 1, 2018.

Valve metals are some groups of inner transitions metals of periodic table that exhibit valve action properties, which could be defined as when acting as cathode these metals allow current to pass but when acting as anode they prevent passage of current owing to rapid building of an insulating anodic film. Due to this property, these are called valve metals, They include:

IUPAC Group 4: part of group 4 is a group (column) of chemical elements in the periodic table comprising titanium (Ti), zirconium (Zr) and hafnium (Hf);

IUPAC Group 5: part of group 5 is a group (column) of chemical elements in the periodic table comprising vanadium (V), niobium (Nb) and tantalum (Ta);

IUPAC Group 6: part of group 6 is a group (column) of chemical elements in the periodic table comprising tungsten (W);

IUPAC Group 13: part of group 13 is a group (column) of chemical elements in the periodic table comprising aluminium (Al).

In the context of the present invention, the IUPAC groups and chemical elements in the corresponding IUPAC groups in the periodic table are used:

IUPAC Group 1: part of group 1 (alkali metals) is a group (column) of chemical elements in the periodic table comprising lithium (Li), sodium (Na), potassium (K), rubidium (Rb), cesium (Cs) and francium (Fr);

IUPAC Group 2: part of group 2 (alkaline earth metals) is a group (column) of chemical elements in the periodic table comprising beryllium (Be), magnesium (Mg), calcium (Ca), strontium (Sr) and barium (Ba);

IUPAC Group 3: part of group 3 is a group (column) of chemical elements in the periodic table comprising Lanthanoids;

IUPAC Group 4: part of group 4 is a group (column) of chemical elements in the periodic table comprising titanium (Ti), zirconium (Zr) and hafnium (Hf);

IUPAC Group 5: part of group 5 is a group (column) of chemical elements in the periodic table comprising vanadium (V), niobium (Nb) and tantalum (Ta);

IUPAC Group 6: part of group 6 is a group (column) of chemical elements in the periodic table comprising chromium (Cr), molybdenum (Mo) and tungsten (W);

IUPAC Group 8: part of group 8 is a group (column) of chemical elements in the periodic table comprising iron (Fe);

IUPAC Group 10: part of group 10 is a group (column) of chemical elements in the periodic table comprising nickel (Ni), palladium (Pd), platinum (Pt);

IUPAC Group 11: part of group 11 is a group (column) of chemical elements in the periodic table comprising copper (Cu), silver (Ag) and gold (Au);

IUPAC Group 12: part of group 12 is a group (column) of chemical elements in the periodic table comprising zinc (Zn);

IUPAC Group 13: part of group 13 is a group (column) of chemical elements in the periodic table comprising boron (B), aluminium (Al), gallium (Ga) and indium (In).

IUPAC Group 14: part of group 14 is a group (column) of chemical elements in the periodic table comprising carbon (C), silicon (Si), germanium (Ge), tin (Sn) and lead (Pb);

IUPAC Group 15: part of group 15 is a group (column) of chemical elements in the periodic table comprising nitrogen (N), phosphorous (P), arsenic (As), antimony (Sb) and bismuth (Bi);

IUPAC Group 16: part of group 16 is a group (column) of chemical elements in the periodic table comprising oxygen (O), sulfur (S) and selenium (Se).

A plasma catalyst in the form of a ceramic-matrix nanocomposite (hereinafter plasma catalyst) according to present invention integrates several physical effects, the main ones are: the pyroelectric effect in nanoscale ferroelectrics, the Schottky effect, field-enhanced emission and electron scattering into films, ionization with a beam of free electrons and photons, spontaneous emergence of a positive feedback between related processes; as well as the catalytic activities of the substances used.

The plasma catalyst according to invention performs thermal energy harvesting of the combustion in the form ultraviolet-visible-infrared (hereinafter UV-VIS-IR) irradiation band, generating electricity pyroelectrically, converting electricity thru internal field-enhanced emission and electron scattering into vacuum ultraviolet-soft X-ray (hereinafter VUV-soft X-ray) ionizing radiation band as plasma forming medium.

Energy harvesting (also known as energy scavenging) is the conversion of ambient energy released for example in the combustion process present in the environment (for example in the combustion chamber) into electrical energy for use in powering autonomous electronic devices or circuits and in the context of the present invention for use in powering the plasma catalyst according to the invention.

The plasma catalyst according to the invention is the lining of a combustion chamber, and hence, direct lead-in of energy forming plasma into the combustion chamber is used. The working conditions of the plasma catalyst are several hundred degrees Celsius temperature and weak oxidizing and alkaline environment.

The plasma catalyst contains several functional layers of nanometric materials, the main of ones are: a layer that absorbs and converts an incident UV-VIS-IR into VUV-soft X-ray output comprising crystallite (polycrystalline or polycrystal structure) and/or single-crystalline (monocrystal structure) nanowhiskers; nanoporous wafer as a matrix for the deposition of nanowhiskers; and in the absence of special wafer coatings, the wafer material itself acts as a solid catalyst.

Preferably, said nanometric materials are the valve metal oxides, polar transition-metal oxides, rare-earth oxides and phosphides, alkali metal oxides and nitrides, silicon oxides, silicon carbides and nitrides, including ternary and higher complexes, which are combined and synthesized in a well-defined manner (by the chemical formula) in accordance with the functional properties and purpose.

Preferably, said absorbing and converting layer is an array of vertically aligned perovskite-like poly- and/or monocrystal nanowhiskers (hereinafter nanowhisker) with/without additional coating and deposited inside the pores of the wafer. Nanowhiskers are defined as one-dimensional (1D) nanocrystalline structures with a diameter of 1 to 100 nm and an aspect ratio (length to diameter) of more than 100.

Preferable, said the nanoporous wafer is a plane-parallel plate comprising an array of self-organized, honeycomb-like and nearly monodisperse nanopores, which are either open on both sides or only one-side and directed perpendicular to the upper/bottom surface of the wafer. The size of the wafer is scalable and depends on the dimension of the lining and the combustion chamber.

The plasma catalyst according to invention is a sintered solid thin ceramic tile for combustion chamber wall lining. The lining of the walls could serve as an additional thermal, oxidation and alkaline preventing shield.

The plasma catalyst according to invention has a scalable architecture; there are no moving parts, self-powered and inherently reliable.

The present invention is generally classed as a plasma catalyst with thermo-driven direct VUV-soft X-ray generation device and therefore not limited to the above sources of thermal energy.

According to present invention a plasma catalyst is provided in the form of ceramic-matrix nanocomposite, said nanocomposite comprises at least first part and second part, wherein said first part comprises a nanoporous wafer and second part comprises a crystalline nanowhiskers.

In said plasma catalyst said nanoporous wafer is comprising at least one of the IUPAC Group 4, Group 5, Group 6 and Group 13 valve metal oxides of the Periodic Table, silicon/silicon dioxide and silicon carbide.

Said nanowhiskers are comprising at least one of perovskite-like poly- and/or single-crystal ferroelectric with pyroelectric properties, transition metals, conductive metal-oxide-metal ceramic or complexes of ones.

In a preferred embodiment said first and second part are covered by a top cover in the form a multilayer thin film or wafer.

Preferably said the top cover comprises at least three layers:
a catalyst grid;
an oxidation and alkaline preventing layer; and
a transparent conductive oxide ceramic layer.

In another preferred embodiment the plasma catalyst, said nanocomposite is in the form of a sintered solid thin ceramic tile.

In another preferred embodiment the plasma catalyst said nanoporous wafer of the first part is in the form plane-parallel wafer comprising an array of self-organized, honeycomb-like and nearly monodisperse pores either cylindrical or V-type population, which are either open on both sides or only one-side and directed perpendicular to the upper/bottom surface of the wafer.

In another preferred embodiment the plasma catalyst said nanoporous wafer is a ceramic, synthesized according to the formula:

$$(Me^4)_I(Me^4)_J(Me^6)_K(Me^{13})_L(Si)_M(SiC)_N(O)_Z,$$

where $Me^4$ is a valve metal of IUPAC Group 4 transition metals of the Periodic Table,
where $Me^5$ is a valve metal of IUPAC Group 5 transition metals of the Periodic Table,
where $Me^6$ is a valve metal of IUPAC Group 6 transition metals of the Periodic Table,
where $Me^{13}$ is a valve metal of IUPAC Group 13 transition metals of the Periodic Table, and
where indexes I, J, K, L, M and Z are numerical proportions of atoms of each type; and one of I, J, K, L, M and Z are greater than 0 elsewise N=1.

In another preferred embodiment the plasma catalyst, said ferroelectric with pyroelectric properties is a perovskite-like crystalline nanowhisker in the form either poly- or single-crystal, synthesized according to the formula:

$$\Sigma[(Me^{1\text{-}2})_I(Me^{1\text{-}2})_J](Me^3)_K\Sigma[(Me^{4\text{-}6})_L(Me^{4\text{-}6,8})_M]\Sigma\\ [(Me^{4\text{-}6})_N(Me^{12\text{-}15})_R](sMe^{13\text{-}16})_X(nMe^{14\text{-}16})_Y\\ (O)_Z,$$

where a superscript index denotes IUPAC Group of the Periodic Table; where a subscript indexes I, J, K, L, M, N, R, X, Y, Z denote numerical proportions of atoms of each type;
where $\Sigma[\ldots]$ denotes formation of a complex comprising several elements of the Group(s) of superscript indices; and
where Me, sMe, nMe denote metal, metalloid and nonmetal respectively; and
where at least one of I, J, L, Z is greater than 0, in general $0 \leq I, J, K, L, M, N, R, X, Y, Z \leq 30$.

The present inventions also include use of plasma catalyst as a component of lining of combustion chamber, said lining serving as an additional thermal, oxidation and alkaline preventing shield of combustion chamber walls.

Preferably said lining of combustion serves an additional thermal, oxidation and alkaline preventing shield of combustion chamber walls.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure and in which:

FIG. 1 depicts a summary of disclosed embodiments;
FIG. 2 illustrates size-driven effects in nanoscale ferroelectric perovskites;
FIG. 3 illustrates an electrophysical phenomena;
FIG. 7 illustrates nanoporous wafer, its structure and materials;
FIG. 8 illustrates nanowhiskers, their structure and materials;
FIG. 9 illustrates top cover, its structure and materials;
FIG. 10 illustrates wafer bonding technique of the plasma catalyst.

MODE(S) FOR CARRYING OUT THE INVENTION

Figure 4:
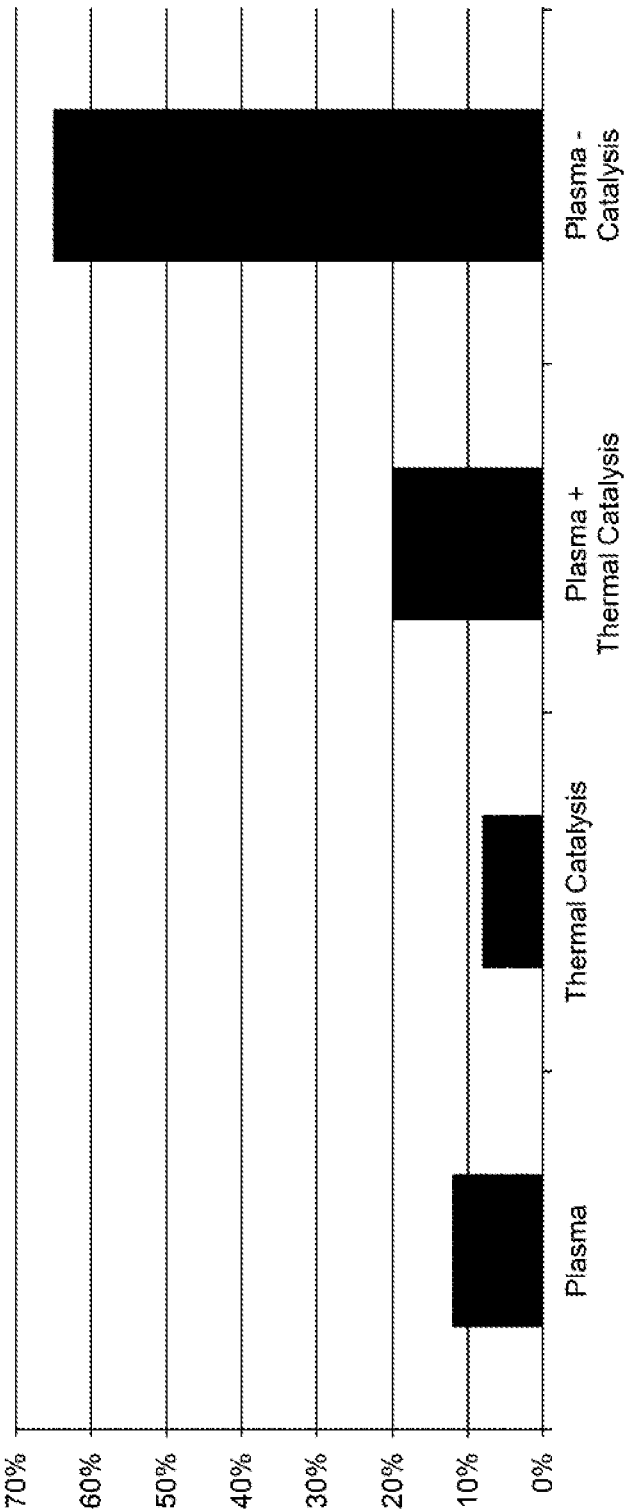
FIG. 4 illustrates the synergistic effect in plasma catalysis.

The present invention has been described and illustrated in detail with references to the accompanying drawings. However, the present invention is not limited to the embodiments described above nor illustrated in the accompanying drawings. There are other possible embodiments and combination of characteristic features which can be derived and implemented according to the present description and accompanying claims.

At least one exemplary embodiment of the present invention is disclosed herein. It is understood that modifications, substitutions and alternatives are apparent to those skilled in the art and may be made without departing from the spirit and scope of this disclosure. This description is intended to cover any device or variants of an exemplary embodiment (s). Furthermore, in this specification, the terms "comprise" or "comprising" or "include" or "including" does not exclude other elements or steps, the terms "one" or "single" does not exclude a plurality, and the term "and/or" means that either or both. Furthermore, features or steps which have been described can also be used in combination with other features or steps and in any order, unless the description or context suggests otherwise.

For the purpose of better understanding of the invention and its embodiments, first are given explanations of the physical effects and phenomena upon which the present invention is based on.

Pyroelectricity of Nanoscale Ferroelectrics

When the dimensions of ferroelectric perovskites are actually limited to 0-2D nanoscale, the laws that govern the properties of bulk ferroelectrics are no longer implemented. In accordance with the phenomenological theory of Landau-Ginzburg-Devonshire and the computational model, the dimensional effect could be used to fine-tune the polarization value (pyroelectric coefficient) and the temperatures of phase transitions in ferroelectric nanostructures, thus providing systems with a tunable giant pyroelectric response.

Variations in the electrophysical, optical, and mechanical properties of 0-2D ferroelectrics are associated with a change in surface tension, which induces internal pressure in the radial direction. The internal pressure in 0-2D nanostructures increases with decreasing size, for instance, in 1D cylindrical crystal in the form of a nanowhisker with a radius, and not the aspect ratio. The effect of pressure depends on the direction of polarization relative to the axis of the crystal.

FIG. 2 depicts the family of curves for size-driven effects of nanowhiskers. In FIG. 2, a) and b) indicate the typical dependences of the Curie temperature $T_C$ and the pyroelectric coefficient P (polarization) of various ferroelectrics on the radius R of a cylindrical nanocrystal, where $T_C$ is the temperature of the second-order phase transition from the ferroelectric phase to the paraelectric. When the polarization vector is directed along the axis, $T_C$ and pyroelectric coefficient P (polarization) are increased with decreasing radius (up to the critical radius $R_{CR}$, at which long-range interactions favoring ferroelectricity become weakened), while for polarization perpendicular to the axis, $T_C$ and P fall with decreasing radius.

Field-Enhanced Emission

FIG. 3, part a) reveals the conditions for the field emission and field-enhanced emission of electrons, Typically for field emission, an electric field with a strength $E \sim 10^7$ V/cm (1 V/nm) on the emitting surface is a necessary condition for electron tunneling through the surface barrier.

In fact, it is impossible to obtain a uniform electric field with strength of $10^7$ V/cm in a plane-parallel electrode system. An exception is the case when an inhomogeneous field is created due to a change in the shape of the emitting surface, for instance, using nanoscale cylinders, cones, etc. Thus, the field strength of emitter-anode system can be increased $E=\gamma \cdot U$, where U is voltage applied to the emitting surface and $\gamma$ (1/cm) is the field enhancement factor.

FIG. 3, plot b) shows the dependence of the field enhancement factor $\gamma(d,D)$ of the coaxial cylindrical system on the diameter d and the distance D between the emitting surface and the anode. As can be seen in the plot, if the field enhancement factor is in the range $2.3 \times 10^4$ cm$^{-1} \leq \gamma \leq 2.6 \times 10^6$ cm$^{-1}$ and the voltage applied to the emitting surface is $4V \leq U \leq 450V$, then the field strength becomes $E \geq 10^7$ V/cm, which is a which necessary condition for field-enhanced emission of electrons.

Electron Scattering into Films

FIG. 3, sketches c) and d) illustrate difference between electron scattering in solids and multilayer films. Electron scattering into multilayer films has a more complicated looking, not only due to the different matters of the layers, but also scattering at the inner interlayer boundaries (Braggs' effect) and interlayer exchange interaction.

In case of solids, the depth of electron penetration (electron track length) $R_{KO}$ into matter can be estimated by the Kanaya-Okayama expression as:

$$R_{KO} = (0.0276 \cdot A \cdot E_0^{1.67}) / \rho \cdot Z^{0.89},$$

where A is the atomic mass; $E_0$ is initial electron energy; $\rho$ is matter density; and Z is atomic number. In the case of compounds (with simplifying assumption, multilayer films could be taken as compounds), the average values are taken into calculations.

The depth of X-ray production can be estimated by Anderson-Hasler expression as:

$$R_{AH} = 0.064(E_0^{1.68} - E_C^{1.68})/\rho,$$

where $E_C$ is the absorption edge (critical excitation) energy.

In general, electronic paths are calculated using mathematical modelling techniques based on Monte Carlo simulations.

Synergistic Effect of Plasma and Heterogeneous Catalyst

FIG. 4 depicts the diagram with experimental data related to evaluation the effectiveness of various catalytic techniques in the destruction of toluene. The relative efficiency (product yield) during the destruction of toluene reaches a maximum of 65% when combining the catalytic properties of the discharge plasma with a solid-state catalyst, additionally placed in a chemical reactor.

Figure 5:
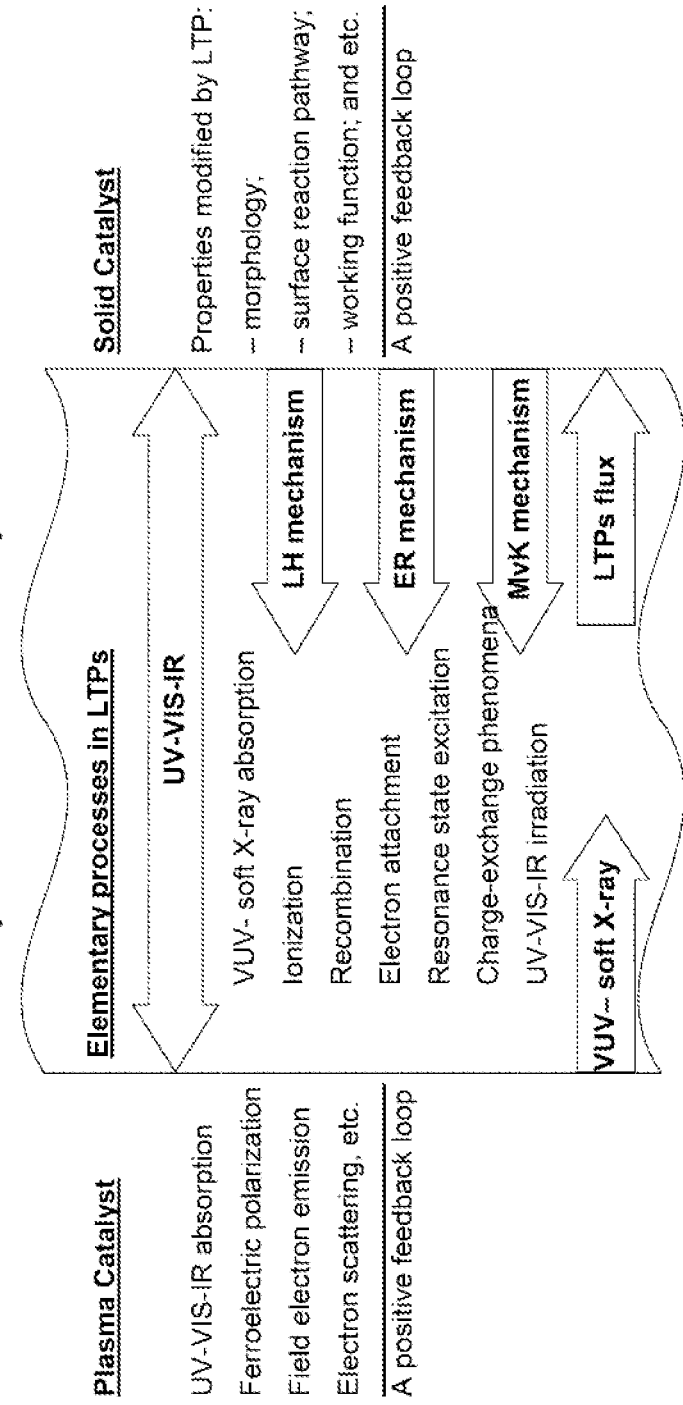
FIG. 5 illustrates Plasma Catalyst-LTPs-Solid Catalyst Interaction.

FIG. 5 shows the interaction mechanism in the system of plasma catalyst-LTPs-solid catalyst. There are the following types of interaction: ionizing radiation—substance; plasma—surface; recombination plasma radiation—environment; and substance—heterogeneous catalyst.

VUV-soft X-ray ionizing radiation efficiently creates reactive radical fragments and vibrationally and electronically excited species. These chemically active species drive reaction kinetics and path, produce unique structures in the gas phase, which cannot be obtained in other ways, at least not in an economically significant way.

The presence of boundaries around the plasma creates strong gradients in which the properties of the plasma change dramatically. It is in these boundary regions that the incident VUV-soft X-ray radiation interacts most strongly with the plasma, often causing unique reactions. And it is precisely on the bounding surfaces that complex interactions of the plasma with the surface occur.

Photons generated by the recombination of excited species in the plasma interact with other species in the plasma or with the boundaries of the plasma, and they can exit the plasma in the form of UV-VIS-IR irradiance.

Basically, three reaction mechanisms have been proposed for redox reactions on the solid catalysts surface:
Langmuir-Hinshelwood mechanism (LH) is that two molecules are adsorbed on neighboring sites, and the adsorbed molecules undergo a bimolecular reaction;
Eley-Rideal mechanism (ER) considers that only one of the molecules adsorbs on the surface of the catalyst and the other one reacts with it directly from the gas phase, without adsorbing; and
Mars and Van Krevelen (MvK) mechanism assumes that some products of the reaction leave the solid catalysts surface with one or more constituents of the catalysts lattice.

The plasma catalyst according to invention performs thermal energy harvesting of the combustion in the form UV-VIS-IR irradiation band, generating electricity pyroelectrically, converting electricity through internal field-enhanced emission and electron scattering into VUV-soft X-ray ionizing radiation band as plasma forming medium.

The plasma catalyst in accordance with the present invention is embodied as a ceramic-matrix nanocomposite based on a combination of valve metal oxides, polar transition-metal oxides, rare-earth oxides and/or phosphides, alkali metal oxides, silicon and/or silicon oxides, silicon carbides and/or nitrides, including ternary and higher complexes in the form of at least one wafer with/without additional coating.

Figure 6:
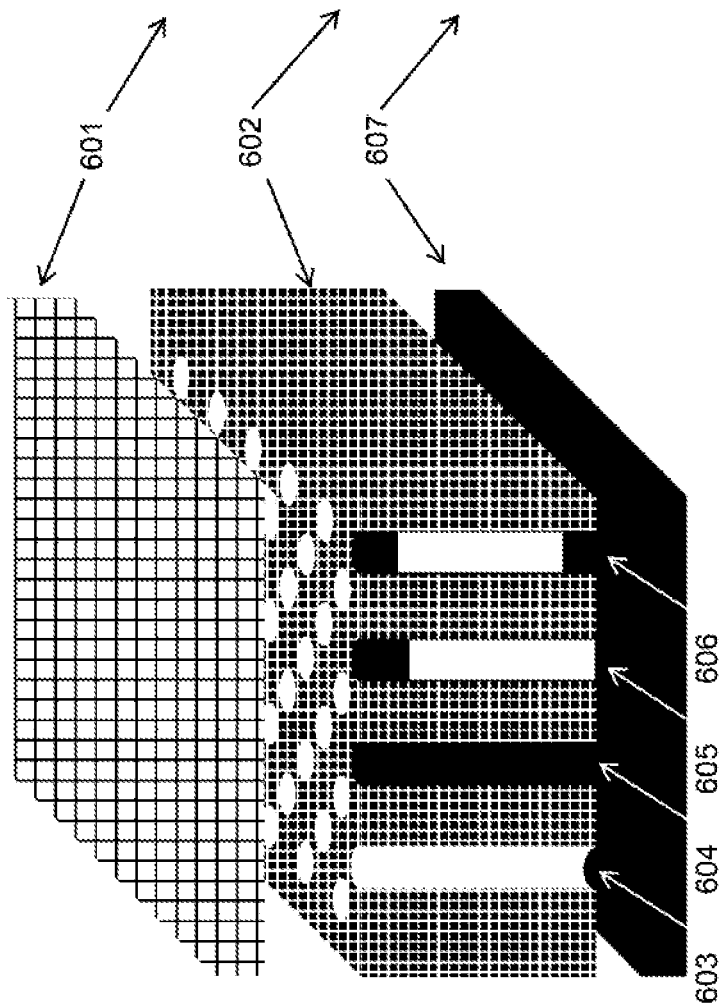
FIG. 6 illustrates plasma catalyst, overall architectural concept of ceramic-matrix nanocomposite.

FIG. 6 depicts the design of one of the possible freely scalable architectural embodiments of the plasma catalyst. The plasma catalyst is a composite comprising at least one wafer (602) with the array of self-organized, honeycomb-like and nearly monodisperse pores (603), where each pore contains at least one of the three nanowhisker (604) either (605) or (606). It is possible that the plasma catalyst may have an additional top cover (601) and a coating (607) of the wafer (602).

FIG. 7 presents the form and materials of nanoporous wafer (602) and coating (607). The wafer contains either one-side or double-side opened pores, in the first case, the wafer has a so-called residual bed, which remains after electrochemical processing of an original wafer material.

Also, the wafer may have pores either cylindrical or V-type population and additional one-side coating. The wafer is a ceramic of valve metal oxides, either silicon/silicon dioxide or silicon carbide synthesized by the formula:

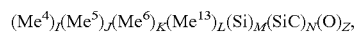

where $Me^{XX}$ is a valve metal of IUPAC Group XX transition metals; a subscript index is numerical proportions of atoms of each type; and one of I, J, K, L, M and Z are greater than 0 elsewise N=1.

The wafer (602) without the top cover (601), synthesized according to the formula:

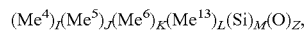

where one of I, J, K, L, M and Z are greater than 0, and is heterogeneous redox catalyst, for instance γ-Al$_2$O$_3$. The wafer could be synthesized by customized formula as required.

The wafer coating (607) is a multilayer coating comprising either nothing or the residual bed, and/or several layers of thin films of compounds according to the formula:

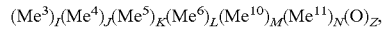

$(Me^3)_I(Me^4)_J(Me^5)_K(Me^6)_L(Me^{10})_M(Me^{11})_N(O)_Z$, where at least one of I, J, K, L, M, N and Z are greater than 0.

The family of nanowhiskers (604), (605) and (606) plays a major role in the absorption of UV-VIS-IR irradiation, generating electricity pyroelectrically, converting electricity through internal field-enhanced emission and electron scattering into VUV-soft X-ray ionizing radiation.

FIG. 8 depicts the family of nanowhiskers deposited into pores of the wafer (702), and includes at least one of the nanowhiskers of a cylindrical or V-type:

The nanowhisker (604) is at least one of perovskite-like whisker or conductive whisker;

The nanowhisker (605) is a composite comprising a perovskite-like whisker and conductive whisker;

The nanowhisker (606) is a composite comprising a perovskite-like whisker and conductive whisker on both sides.

The perovskite-like nanowhiskers have homogeneous or inhomogeneous crystalline structure, and there are in the form either poly- or monocrystals, synthesized according to the general formula:

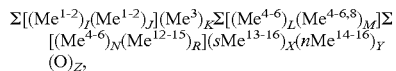

$\Sigma[(Me^{1-2})_I(Me^{1-2})_J](Me^3)_K\Sigma[(Me^{4-6})_L(Me^{4-6,8})_M]\Sigma$
$[(Me^{4-6})_N(Me^{12-15})_R](sMe^{13-16})_X(nMe^{14-16})_Y$
$(O)_Z$, where a superscript index denotes IUPAC Group; a subscript index denotes numerical proportions of atoms of each type; Σ[ . . . ] denotes (possible) formation of a complex comprising several elements of the Group(s) of superscript indices;

Me, sMe, nMe are metal, metalloid and nonmetal respectively; and at least one of I, J, L, Z are greater than 0 (e.g. LiNbO$_3$-perovskite-like lattice, homogeneous, monocrystal), in general 0≤I, J, K, L, M, N, R, X, Y, Z≤30, for instance, Barium sodium niobate Ba$_2$NaNb$_5$O$_{15}$ perovskite-like crystal.

Conductive nanowhisker materials are at least one of transition metals, metal-oxide-metal (MOM) or so-called transparent conductive oxide (TCO) ceramics with low resistance at a temperature of several hundred degrees Celsius.

FIG. 9 depicts the top cover (601), structure and materials. In the case of using the top cover, it should be transparent in the wavelength range in accordance with FIG. 9a and may be in the form of a thin film coating or wafer.

The top cover (601) as a thin film coating is comprising at least a catalyst grid layer (901), oxidation and alkaline preventing layer (902) and TCO ceramic layer (903).

The catalyst grid layer (901) is at least one of a transition-metal thin film or MOM thin film according to the general formula:

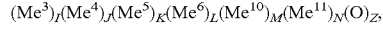

$(Me^3)_I(Me^4)_J(Me^5)_K(Me^6)_L(Me^{10})_M(Me^{11})_N(O)_Z$, where at least one of I, J, K, L, M, N and Z are greater than 0.

When the top cover (601) is a Si wafer (904), it comprises at least the following layers: the catalyst grid layer (901); oxidation and alkaline preventing layer (902) and TCO ceramic layer (903).

FIG. 10 depicts the wafer bonding techniques for packaging the plasma catalyst and materials used to. In the case where the plasma catalyst contains several wafers, the packaging can be performed in one of the following ways:

Adhesive bonding, FIG. 10a;
Glass frit bonding, FIG. 10b.

Adhesive bonding technique is based on applying a specific mixture (1001) of an inorganic binder and fillers, which are selected taking into account the following parameters of wafers (601, 602) and calcined adhesive (1002):

The spread of the coefficient of thermal expansion (CTE) for all materials used is not more than ±5%;

The service temperature and bonding pressure should not lead to damage to any plasma catalyst components; and Electroconductivity.

Glass frit bonding technique is based on using a specific mixture (1003) of an organic binder, glass powder and, if necessary, conductive fillers, which are selected taking into account the following parameters of wafers (601, 602) and glass (1004):

The spread of the coefficient of thermal expansion (CTE) for all materials used is not more than ±5%;

The service temperature and bonding pressure should not lead to damage to any plasma catalyst components; and Electroconductivity.

The plasma catalyst in the form of ceramic-matrix nanocomposite is the sintered solid thin ceramic tile in which there are no moving parts, self-powered and inherently reliable.

The plasma catalyst is placed inside the combustion chamber in the form of a lining and, in parallel, can serve as a thermal shield of the chamber walls.

For person skilled in the art it is obvious that the present invention is not limited to the embodiments depicted in the attached drawings and described above, but within the scope of attached claims many other embodiments are possible.

The invention claimed is:

1. A plasma catalyst in the form of a ceramic-matrix nanocomposite for initiation and sustaining plasma-assisted combustion, said ceramic-matrix nanocomposite being a structure comprising:

(1) at least a first part and a second part, said first part comprising a nanoporous wafer, and said second part comprising a plurality of crystalline nanowhiskers;

wherein said nanoporous wafer comprises at least one of the following components: (a) a metal oxide selected from the following IUPAC groups of the Periodic Table: (i) Group 4 metal oxides of Ti, Zr, and Hf, (ii) Group 5 metal oxides of V, Nb, and Ta, (iii) Group 6 metal oxide of W, and (iv) Group 13 metal oxide of Al, (b) silicon or silicon dioxide, and (c) silicon carbide; and wherein each of the plurality of the crystalline nanowhiskers has a diameter of 1 to 100 nm and an aspect ratio length to diameter of more than 100 and comprises at least one of the following materials: (i) a perovskite poly- and/or single-crystal ferroelectric material with pyroelectric properties, (ii) a transition metal, or (iii) a conductive metal-oxide-metal ceramic, and (iv) complexes thereof; and (2) a top cover in the form of a multilayer thin film or wafer covering said first and second parts, said top cover comprising at least the following three layers:
a catalyst grid;
an oxidation and alkaline preventing layer; and
a transparent conductive oxide ceramic layer.

2. The plasma catalyst according to claim 1, where said nanocomposite is in the form of a sintered solid thin ceramic tile.

3. The plasma catalyst according to claim 1, where said nanoporous wafer of the first part is in the form of a plane-parallel wafer comprising an array self-organized, honeycomb and nearly monodisperse nanopores, which are either open on both sides or only one-side and directed perpendicular to the upper/bottom surface of the nanoporous wafer.

4. The plasma catalyst according to claim 3, wherein the pores are cylindrical or form a V-shaped dispersion.

5. The plasma catalyst according to claim 1, where said nanoporous wafer is a ceramic, synthesized according to the formula:

$$(Me^4)_I(Me^4)_J(Me^6)_K(Me^{13})_L(Si)_M(SiC)_N(O)_Z,$$

where $Me^4$ is a valve metal of IUPAC Group 4 transition metals of the Periodic Table, selected from a group containing Ti, Zr, and Hf, where $Me^5$ is a valve metal of IUPAC Group 5 transition metals of the Periodic Table, selected from a group containing V, Nb, and Ta, where $Me^6$ is W, where $Me^{13}$ is a valve metal of IUPAC Group 13 transition metals of the Periodic Table, and where indexes I, J, K, L, M and Z are numerical proportions of atoms of each type; and one of I, J, K, L, M and Z is greater than 0 elsewise N=1.

6. The plasma catalyst according to claim 5, wherein $Me^{13}$ comprises Al.

7. The plasma catalyst according to claim 1, wherein the each of the plurality of the crystalline nanowhiskers comprises the perovskite poly- and/or single-crystal ferroelectric material with pyroelectric properties synthesized according to the formula:

$$\Sigma[(Me^{1-2})I(Me^{1-2})J](Me^3)K\Sigma[(Me^{4-6})L(Me^{4-6,8})M]\Sigma[(Me^{4-6})N(Me^{12-15})R](sMe^{13-16})X(nMe^{14-16})Y(O)Z,$$

where a superscript index denotes IUPAC Group of the Periodic Table, where subscript indexes I, J, K, L, M, N, R, X, Y, Z denote numerical proportions of atoms of each type, where Σ[ . . . ] denotes formation of a complex comprising a plurality of elements of the Group(s) of superscript indices, where Me, sMe, nMe denote metal, metalloid and non-metal respectively, and where at least one of I, J, L, Z is greater than 0.

8. The plasma catalyst according to claim 7, wherein 0≤I, J, K, L, M, N, R, X, Y, Z≤30.

9. A lining of a combustion chamber wall comprising the plasma catalyst according to claim 1 as a component thereof, said lining being configured to act as an additional thermal, oxidation and alkaline preventing shield of the combustion chamber wall.

10. The plasma catalyst according to claim 1, where said nanocomposite is in the form of a sintered solid thin ceramic tile and where said nanoporous wafer of the first part is in the form of a plane-parallel wafer comprising an array of self-organized, honeycomb and nearly monodisperse nanopores, which are either open on both sides or only one-side and directed perpendicular to the upper/bottom surface of the nanoporous wafer.

11. The plasma catalyst according to claim 1, where said nanocomposite is in the form of a sintered solid thin ceramic tile, and where said sintered solid thin ceramic tile is synthesized according to the formula:

$$(Me^4)_I(Me^5)_J(Me^6)_K(Me^{13})_L(Si)_M(SiC)_N(O)_Z,$$

where $Me^4$ is a valve metal of IUPAC Group 4 transition metals of the Periodic Table, selected from a group containing Ti, Zr, and Hf, where $Me^5$ is a valve metal of IUPAC Group 5 transition metals of the Periodic Table, selected from a group containing V, Nb, and Ta, where $Me^6$ is W, where $Me^{13}$ is a valve metal of IUPAC Group 13 transition metals of the Periodic Table, and where indexes I, J, K, L, M and Z are numerical proportions of atoms of each type; and one of I, J, K, L, M and Z is greater than 0 elsewise N=1.

12. The plasma catalyst according to claim 11, wherein $Me^{13}$ comprises Al.

13. The plasma catalyst according to claim 1, where said nanocomposite is in the form of a sintered solid thin ceramic tile and where said nanoporous wafer of the first part is in the form of a plane-parallel wafer comprising an array of self-organized, honeycomb and nearly monodisperse nanopores that are either cylindrical or V-shaped population, which are either open on both sides or only one-side and directed perpendicular to the upper/bottom surface of the nanoporous wafer, and where said ceramic is synthesized according to the formula:

$$(Me^4)_I(Me^5)_J(Me^6)_K(Me^{13})_L(Si)_M(SiC)_N(O)_Z,$$

where $Me^4$ is a valve metal of IUPAC Group 4 transition metals of the Periodic Table, selected from a group containing Ti, Zr, and Hf, where $Me^5$ is a valve metal of IUPAC Group 5 transition metals of the Periodic Table, selected from a group containing V, Nb, and Ta, where $Me^6$ is W, where $Me^{13}$ is a valve metal of IUPAC Group 13 transition metals of the Periodic Table, and where indexes I, J, K, L, M and Z are numerical proportions of atoms of each type; and one of I, J, K, L, M and Z is greater than 0 elsewise N=1.

14. The plasma catalyst according to claim 13, wherein $Me^{13}$ comprises Al.

15. The plasma catalyst according to claim 1, wherein the nanoporous wafer comprises each of components (a), (b) and (c).

16. The plasma catalyst according to claim 15, wherein the nanoporous wafer comprises a metal oxide from each of the following Periodic Table groups: Group 4, Group 5, Group 6 and Group 13.

* * * * *